March 9, 1971  R. K. DODDS  3,568,326
EXTENSOMETER

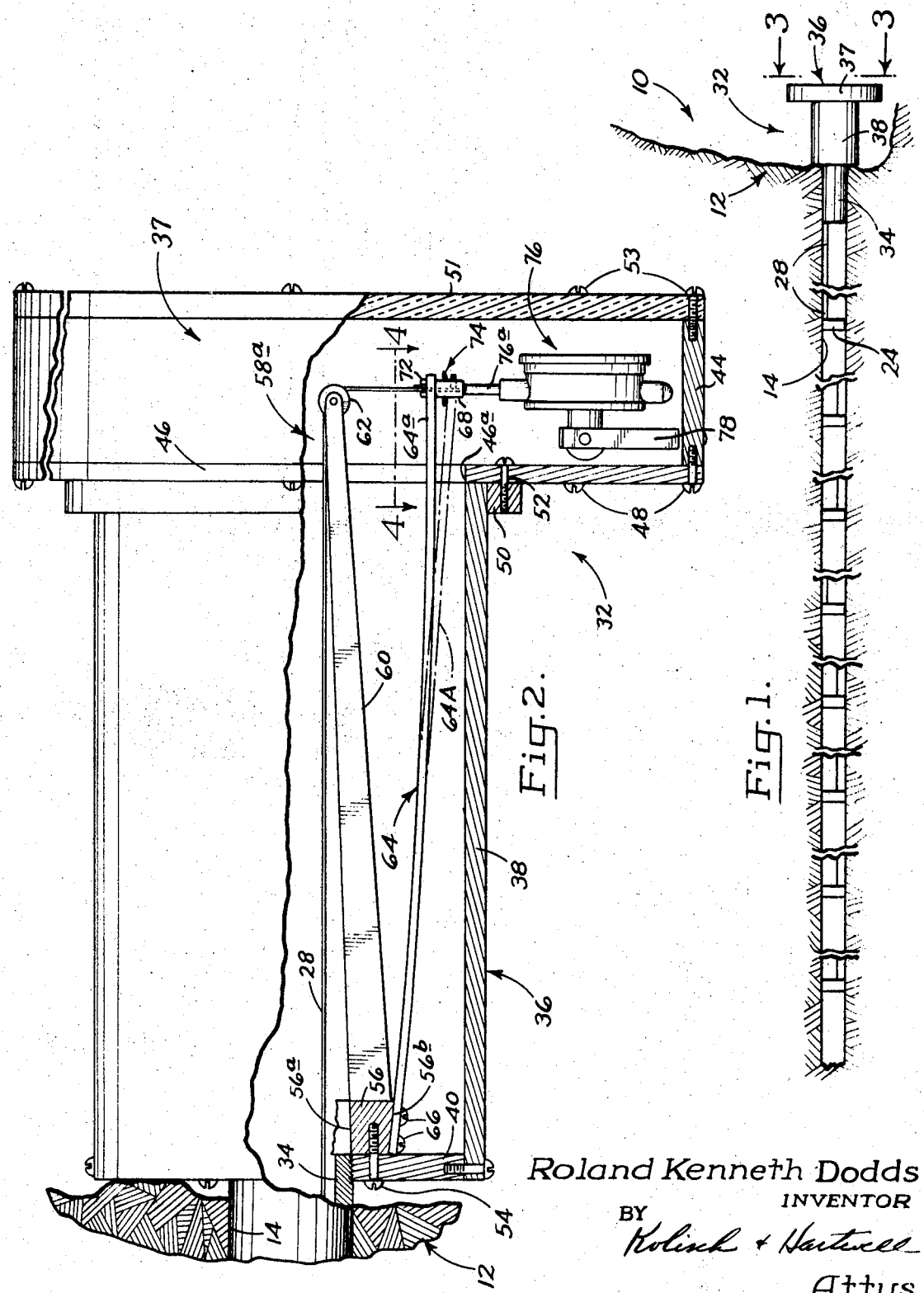

Filed Aug. 12, 1968  2 Sheets-Sheet 2

Roland Kenneth Dodds
INVENTOR
BY Kolisch & Hartwell
Attys.

United States Patent Office 3,568,326
Patented Mar. 9, 1971

3,568,326
EXTENSOMETER
Roland K. Dodds, 520 SW. 6th Ave.,
Portland, Oreg. 97204
Filed Aug. 12, 1968, Ser. No. 751,931
Int. Cl. G01b 5/02, 5/30
U.S. Cl. 33—125                                4 Claims

ABSTRACT OF THE DISCLOSURE

An extensometer for measuring movement in a land mass by measuring the displacement of wires anchored to the land mass. Each wire has an end that extends into a casing in the extensometer, and the wire end is detachably fastened to a movable spring-biased ferrule which tenses the wire. A gauge in the casing, viewable from the casing's front, indicates directly any change in the position of the ferrule produced by displacement of the wire.

---

This invention relates to an extensometer, and more particularly to an extensometer of the type used to measure movement in a land mass by measuring the displacement of one or more wires anchored to the mass.

In construction projects involving a land mass, such as the construction of a dam or the building of a tunnel, it is important for engineering purposes to have information regarding the stability of the land mass. Explaining this more fully, and explaining a specific practice employed, an adit might be prepared in a rock mass which is a passage of some size extending into the rock. The production of the adit disrupts, to a degree, the natural stability of the rock, with forces then being set up tending to cause displacement in the rock in regions adjacent the adit. To measure these displacements a bore may be prepared extending into the rock from the adit, and elongated wires anchored inside this bore at points distributed along its length. If measurements are then taken periodically adjacent the mouth of such bore of the displacements which may have taken place in such wires, an engineer can use this information in determining the stability of the mass.

Ordinarily, the most significant displacement of the mass takes place soon after preparation of the adit, with the amount of displacement occurring then tapering off over a period of time. It is important, therefore, that one be able to measure accurately such displacements soon after preparation of the bore and placement of the wires. It should also be remembered that the greatest amount of displacement will occur immediately adjacent the adit, and that the displacements to be expected at points spaced farther from the adit are increasingly less. It is for this reason that multiple wires are usually employed which are anchored in the bore at points distributed along its length, as this permits a measurement of displacements in the bore at a series of spaced points.

Apparatus employed in the past for taking such measurements has been characterized by a number of disadvantages. Certain apparatus in making measurements has relied upon electrical resistance elements which tend to be sensitive to specific environmental conditions, and this has impaired the accuracy of readings obtained. Setting up the apparatus has also been a problem in that one has not been permitted to set up the apparatus and then immediately take readings which reflect with accuracy the amount of displacements occurring. Further, it has been difficult to take rapidly and conveniently readings reflecting the displacements occurring in the multiple wires which preferably should be provided along a bore.

A general object of the present invention, therefore, is to provide a novel extensometer which takes care of the abovementioned difficulties in a practical and satisfactory manner.

More specifically, an object of the invention is to provide an extensometer which can be used in conjunction with an elongated wire or line to indicate accurately, and over a span of time beginning immediately after its installation, land movement which occurs along a bore of the type mentioned above.

A further object of the invention is to provide such an extensometer which may be employed with multiple wires or lines.

According to a prefered embodiment of the invention the extensometer features multiple gauges disposed approximately radially of, and circumferentially distributed within, a gauge housing section which forms one end of a casing in the extensometer. These gauges are readable directly from one end of the casing. Wires or lines which are anchored in the bore extend into the casing through a tubular section, and each wire is connected to a movable part which is spring-biased to apply tension to the wire. Each spring-biased part is operatively coupled to a gauge member in one of the gauges. The organization is such that upon a wire being displaced by land movement, the extent of such movement is readable directly from the gauge.

These and other objects and advantages attained by the invention will become more fully apparent as the description which follows is read in conjunction with the accompanying drawings, wherein:

FIG. 1 is a simplified view illustrating a section of a rock mass wherein there has been prepared an adit, with a bore radiating from the adit, and showing an extensometer constructed according to the invention mounted in operative position adjacent the mouth of the bore;

FIG. 2 is an enlarged side elevation of the extensometer in FIG. 1, with portions of a casing in the extensometer broken away to illustrate details of construction, and with certain parts inside the casing removed in order to simplify the figure;

Figures 3, 4:
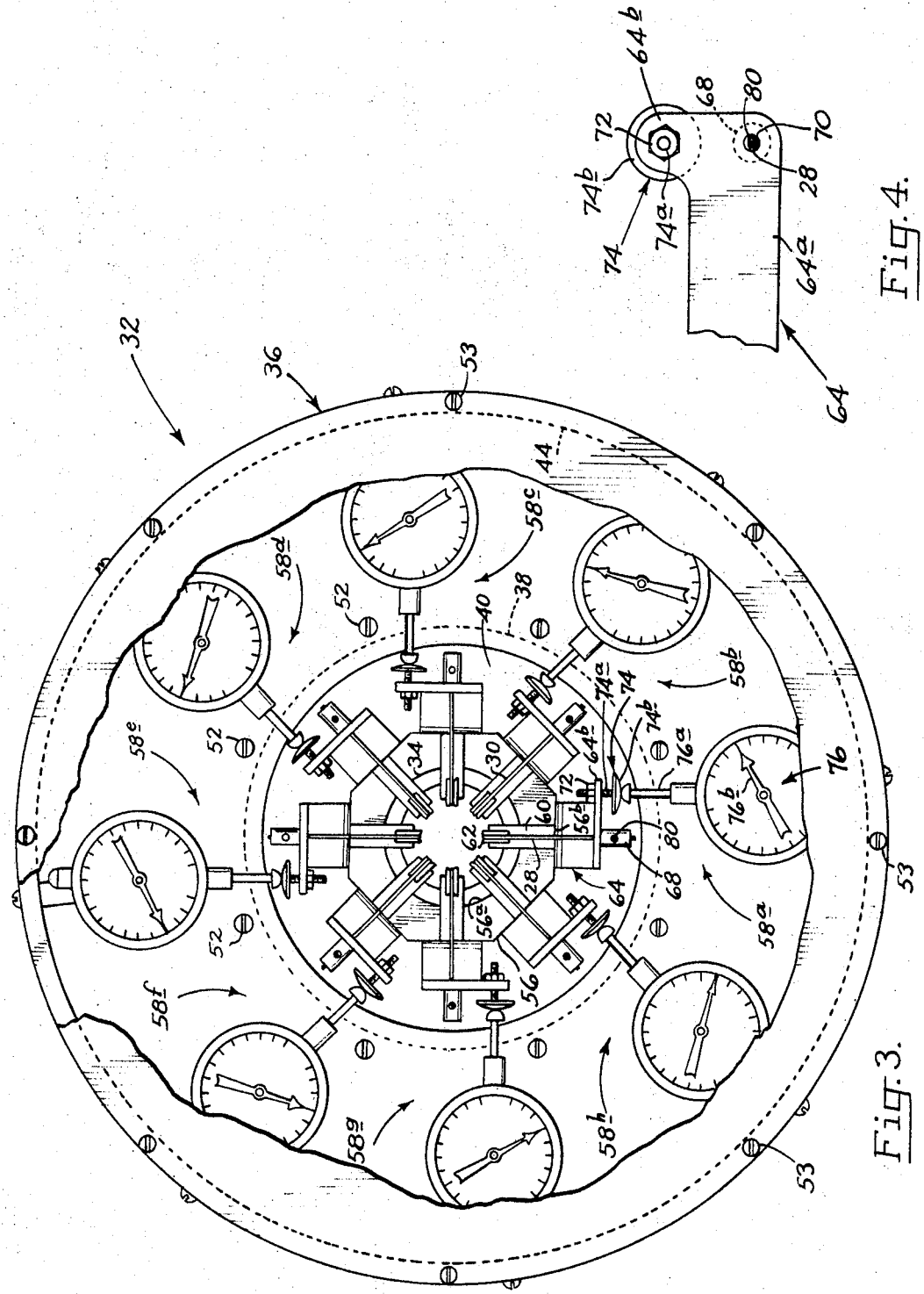

FIG. 3 is a front elevation, on the same scale as FIG. 2, taken along the line 33 in FIG. 1; and FIG. 4 is a view, on a larger scale than FIGS. 2 and 3, taken along the line 4—4 in FIG. 2 illustrating the free end of a cantilevered spring employed in the extensometer.

Turning now to the drawings, and referring first to FIG. 1, indicated generally at 10 is an adit, or tunnel, extending horizontally into a rock mass, which is indicated generally in cross section at 12. Extending outwardly from adit 10 into regions of the rock mass where it is desired to measure displacements in the mass is an elongated bore 14. Considering typical dimensions, the adit may have a width of approximately ten feet and a height of about twelve feet. The bore may be about thirty-five feet in length, and have a diameter of approximately four or five inches. Typically, more than one bore is provided, and these radiate from the adit at points distributed thereabout.

Suitably secured in place at various points spaced along the length of bore 14 are line anchors, such as the one shown at 24. Eight anchors are provided in bore 14, although it should be understood that a greater or lesser number may be used. These anchors are conventional devices, and thus are shown only in simplified block form. Fastened to each anchor, and extending therefrom toward the right end or mouth of bore 14 in FIG. 1 is an elongated wire or line, such as the line shown at 28. It should be noted that each anchor accommodates the passage of lines extending from other anchors positioned at more remote locations from the mouth of the bore. The right ends in FIG. 1 of the various lines extend into an extensometer 32.

Considering now in detail the construction of extensometer 32, and referring also to FIGS. 2 and 3, it includes a casing 36 comprising a tube section 34 which fits within bore 14, another tube section 38 joined through a wall 40 to tube section 34 of somewhat larger diameter than tube section 34, and a gauge housing section 37. The gauge housing section includes a cylindrical wall 44 of larger diameter than tube section 38, and an end wall 46 joined to the cylindrical wall by screws 48. The gauge housing section is joined to tubular section 38 by screws 52 fastening wall 46 to a collar 50 which is integral with section 38. Wall 46 includes a central bore 46a having a diameter which is substantially the same as the inner diameter of tube section 38. Tube sections 34, 38 and bore 46a provide a passage extending into casing 36 for the admission of wires 28. The right end of casing 36, which constitutes the front of the casing, is closed off by a transparent window 51 normal to the axis of such passage, permitting viewing of the inside of the gauge housing section. Window 51 is fastened to cylindrical wall 44 by screws such as those shown at 53.

Fastened to flange 40 by means of screws 54 is a ring-shaped mount 56. As viewed in FIG. 3, the inside peripheral outline of the mount is circular, and is defined by a central cylindrical bore 56a. Bore 56a has a diameter which is about the same as the outside diameter of tube 34. The outside peripheral outline of the mount is octagonal, and is defined by eight planar faces, such as face 56b. Each of these faces, as can be seen in FIG. 2 with reference to face 56b, slopes away from the axis of bore 56a progressing to the right in FIG. 2.

Referring to FIG. 3, indicated generally at 58a–58h, inclusive, are mechanisms which are provided in the extensometer for mounting the ends of lines 28. These mechanisms are similar in construction, and are distributed circumferentially about the inside of casing 36, and about the axis of the passage providing for the admission of wires 28.

Considering the construction of one of the mechanisms 58a–58h, it comprises an elongated arm or strut 60. The left end of strut 60 in FIG. 2 is suitably joined to mount 56. The arm slopes axially inwardly in section 38 progressing toward a free end located within gauge housing section 37. Journaled on this free end, or on the right end of the strut in FIG. 2, is a pulley 62.

Also forming part of the mechanism is an elongated blade-like spring 64 generally paralleling the axis of the passage providing for the admission of wires into the casing. The left end of spring 64 in FIG. 2 is fastened to face 56b in mount 56 by means of screws 66. The spring cantilevers from the mount, and extends toward a free end 64a which is disposed adjacent one side of pulley 62. As can be seen in FIG. 4, the free end of spring 64 includes a lateral extension 64b. In an unbent and unstressed state, the spring occupies the dash-dot outline position shown at 64A in FIG. 2. As normally employed in the extensometer, however, and for reasons which will be explained later, the spring is stressed and occupies a position similar to that shown in solid outline. The free end thus is movable in a direction extending generally radially of the passage providing for the admission of wires into the casing.

Suitably mounted on the free end of spring 64 for movement with the spring is a ferrule, or spring-biased part, 68. The ferrule is disposed with its axis extending radially of the gauge housing section (also tube sections 34, 38), and by reason of its mounting on the spring is movable in a direction extending generally radially of the gauge housing section. A bore 70 (see FIG. 4) in the spring is axially aligned with the hollow interior of the ferrule. The ferrule is adapted to receive the end of a wire or line passed therethrough, and a set screw 80 mounted on one side of the ferrule provides a means for clamping onto the end of such wire or line.

Anchored, as by welding, to lateral extension 64b is a nut 72. Nut 72 and a suitably aligned bore in extension 64b receive the threaded shaft portion 74a of an adjustable element 74. Also part of element 74 is a somewhat dome-shaped head portion 74b which faces generally in a radially outward direction toward wall 44.

Associated with each of the mechanisms 58a–58h is a gauge 76. The gauge is mounted on wall 44 of the casing through mounting structure 78. Gauge 76 is a conventional mechanically operated device, and includes an elongated, axially movable plunger, or gauge member 76a, which projects toward and engages the head portion of element 74. Plunger 76a is biased outwardly of the gauge by the usual biasing spring (concealed) provided in the gauge. The position of plunger 76a is indicated by a movable pointer 76b, and the gauge is oriented so that pointer 76b can be seen through window 51.

In the extensometer, tube sections 34, 38 together define a passage for admitting lines 28 into the interior of gauge housing section 37. Considering the disposition of a particular line, and referring to FIG. 2, it extends through this passage toward the extremity of a strut 60, whence the line extends as a bend trained over pulley 62 carried at the end of the strut. The line thence extends through the ferrule carried by the spring located radially outwardly of the strut.

Explaining now how extensometer 32 may be employed, with window 51 removed from the front of casing 36, each of the eight lines or wires extending from an anchor in bore 14 may be admitted to the casing, trained over a pulley, and clamped within a ferrule, using set screw 80. Because the various pulleys and ferrules are located immediately adjacent the front of the casing, such attaching of a line may be made relatively easily and quickly. Preferably, each line is clamped to a ferrule in such a manner that the spring supporting the ferrule exerts a pull, typically about fifteen pounds, on the line. Adjustable elements 74 may then be adjusted to bring them against the plungers in the gauges and to preposition the pointers in the various gauges.

With the extensometer mounted in place, and should a shifting in the rock take place causing a line 28 to become displaced relative to the extensometer, such displacement will be accompanied with movement of the end of the line, and the ferrule attached to such end, in a direction either radially inwardly or outwardly within the gauge housing section. In the case of radially outward movement, slackening of the tension in the line is taken up by spring 64 flexing outwardly, and in case of radial inward movement, the free end of the spring is pulled radially inwardly. The plunger and the gauge associated with the spring follow movement of the spring, and any movement of the plunger is indicated by the pointer in the gauge. With the gauges all visible through window 51, the gauges facing such window, an operator by inspecting the gauges can immediately tell the extent of any displacement which has taken place in any of the wires.

The proposed extensometer is capable of immediate and accurate measurements. Immediate readings are possible because the apparatus permits attachment of wire ends without introducing kinks in the wires that require time to straighten out. Note that each wire curves smoothly and without sharp bending over a pulley, and from the pulley the wire extends in a substantially straight expanse into the interior of a ferrule where it is clamped in place. Readings are provided by a mechanical system independent of environmental conditions.

With pulleys provided to train the various wires inside the casing in the manner explained, the gauges may be oriented in such a manner that all their pointers can be viewed simultaneously through window 51.

The cantilevered springs mounted on the casing provide a relatively simple and reliable means for pretensing the wires. With the springs extending generally axially of tube section 38, relatively long springs may be used without such necessitating a large size in the gauge housing section.

A further advantage of the proposed extensometer is that it readily accommodates multiple lines.

While an embodiment of the invention has been described herein, it is appreciated that variations and modifications may be made without departing from the basic principles of the invention. Accordingly, it is desired to cover all such variations and modifications which would be apparent to one skilled in the art, and that come within the scope of the appended claims.

It is claimed and desired to secure by Letters Patent:

1. In an extensometer having multiple wires which in operative position extend substantially parallel to each other and are adapted to extend axially along an elongated bore; a casing, a passage on one side of the casing admitting said wires into the casing with such substantially paralleling the axis of the passage, plural movable spring-biased parts supported on the casing, each of said wires being connected to a spring-biased part and said parts being distributed circumferentially about said passage axis, said parts being movable generally radially of said passage on axial movement of the wires, multiple gauges including gauge plungers for actuating the gauges mounted on the casing and distributed circumferentially about said passage axis, a gauge being provided for each wire and such gauge being generally radially outwardly of the spring-biased part with which such wire is connected, coupling means for each wire operatively coupling the spring-biased part for the wire to an associated gauge plunger whereby movement of the spring-biased part produces actuation of the associated gauge, a pulley for each wire mounted on the casing for training the wire in a bend so that an end portion of the wire projects radially to a connection with said spring-biased part, and an elongated cantilevered biasing spring generally paralleling the axis of said passage for each of said spring-biased parts, said spring having one end anchored to the casing and a free end mounting the spring-biased part.

2. The extensometer of claim 1, wherein the spring-biased part comprises a releasable ferrule receiving the end portion of a wire with the axis of the ferrule substantially aligned with the end portion of the wire.

3. The extensometer of claim 1, wherein the side of the casing opposite the casing's said one side extends substantially normal to the axis of said passage and wherein the gauges have faces which face said opposite side of the casing.

4. The extensometer of claim 1, wherein the coupling means comprises an element adjustably mounted on the free end of the spring engaging the plunger in a gauge.

References Cited

UNITED STATES PATENTS

| 3,092,912 | 6/1963 | Reed | 33—125X |
| 3,380,166 | 4/1968 | Abel et al. | 33—125 |
| 3,404,460 | 10/1968 | Livingston et al. | 33—1(H)X |

FOREIGN PATENTS

| 185,501 | 3/1967 | U.S.S.R. | 33—1(H) |

ROBERT B. HULL, Primary Examiner

U.S. Cl. X.R.

33—1